(12) United States Patent
Laakso et al.

(10) Patent No.: US 6,487,411 B1
(45) Date of Patent: Nov. 26, 2002

(54) DIRECTED RETRY FOR CALL SETUP

(75) Inventors: Jussi-Pekka Laakso, Helsinki (FI); Pekka Ranta, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/454,365

(22) Filed: Dec. 3, 1999

Related U.S. Application Data

(63) Continuation of application No. PCT/FI98/00483, filed on Jun. 5, 1998.

(30) Foreign Application Priority Data

Jun. 5, 1997 (FI) .................................................. 972395

(51) Int. Cl.[7] .............................................. H04B 7/00
(52) U.S. Cl. .................... 455/437; 455/440; 455/525
(58) Field of Search ........................... 455/440, 441, 455/443, 453, 436, 437, 439, 510, 513, 525, 456, 67.1

(56) References Cited

U.S. PATENT DOCUMENTS

| | | | | |
|---|---|---|---|---|
| 5,095,531 A | * | 3/1992 | Ito ............................. | 455/456 |
| 5,293,641 A | | 3/1994 | Kallin et al. | |
| 5,357,559 A | | 10/1994 | Kallin et al. | |
| 5,369,681 A | | 11/1994 | Boudreau et al. | |
| 5,722,072 A | * | 2/1998 | Crichton et al. ............ | 455/525 |
| 6,052,598 A | * | 4/2000 | Rudrapatna et al. ........ | 455/456 |

FOREIGN PATENT DOCUMENTS

| | | |
|---|---|---|
| EP | 0 589 279 | 3/1994 |
| FI | 941779 | 10/1995 |
| GB | 2 287 858 | 9/1995 |
| WO | 92/01950 | 2/1992 |
| WO | 95/31880 | 11/1995 |
| WO | 97/00587 | 1/1997 |

OTHER PUBLICATIONS

"The GSM System for Mobile Communications" Mouly, et al. pp. 7–15.

Jan. 8, 1999, International Search Report for PCT/FI98/00483.

* cited by examiner

Primary Examiner—Lester G. Kincaid
(74) Attorney, Agent, or Firm—Altera Law Group, LLC

(57) ABSTRACT

A method for directed retry in a mobile communication system including measuring the reception level of the signal from the neighboring cells of the target cell in the mobile station, sending the measurement results as a report message from the mobile station to the mobile communication network, detecting the need for directed retry, selecting at least one neighboring cell as the candidate cell for directed retry on the basis of the measurements, and executing directed retry into the selected target cell. It is characteristic for the method according to the invention that the change in the reception level of the signal of at least one candidate cell is determined on the basis of the measurements performed in the mobile station, and the target cell for directed retry is selected from the candidate cells by using the determined changes in the reception levels of the signals so that, the selected target cell is the candidate cell whose value for the change in the reception level of the signal meets a predefined criterion.

9 Claims, 2 Drawing Sheets

DIRECTED RETRY FOR CALL SETUP

This application is a continuation of international application Ser. No. PCT/FI98/00483, filed Jun. 5, 1998.

FIELD OF THE INVENTION

This invention relates to a method for directed retry in a mobile communication system. The method consists of the following steps: measuring the reception level of the signals from the neighboring cells of the target cell in the mobile station, sending the measurement results as a report message from the mobile station to the mobile communication network, detecting the need for directed retry, selecting at least one neighboring cell as the candidate cell for directed retry on the basis of the measurements, and executing the directed retry to the selected target cell.

Additionally, the invention relates to a control unit for controlling the directed retry.

BACKGROUND OF THE INVENTION

FIG. 1 (attached) shows a simplified block diagram of the Pan-European GSM mobile communication system. The MS (Mobile Station) is connected via a radio path to a BTS (Base Transceiver Station), in FIG. 1 to base station BTS1. A BSS (Base Station Sub-system) consists of a BSC (Base Station Controller) and the base stations BTS controlled by it. An MSC (Mobile Services Switching Center) usually controls several base station controllers BSC. The mobile services switching center MSC is connected to other mobile services switching centers and, via a GMSC (Gateway Mobile Services Switching Center), the GSM network is connected to other networks, such as the public switching telephone network PSTN, another mobile communication network PLMN or the ISDN network. The operation of the entire system is controlled by the OMC (Operation and Maintenance Center). The subscriber data of the mobile station MS is permanently stored in the HLR (Home Location Register) of the system and temporarily in the VLR (Visitor Location Register) of the area in which the mobile station MS is currently located.

The mobile station MS continuously measures the signals of the base stations BTS nearest to the cell in which it is located, for example, to determine the base station that offers the best signal and to be ready for a cell handover. Each base station BTS continuously transmits in its cell broadcast channel information intended for all mobile stations MS. This information includes, among other things, the BSIC (Base Station Identity Code), the LAI (Location Area Identifier), and information about the frequencies of the neighboring base stations which the mobile stations MS should be measuring. For example, in the GSM mobile communication system the mobile station MS can measure the reception level and quality of the serving base station and simultaneously the reception level of up to 32 other base stations BTS. When in radio connection with a base station BTS, the mobile station MS frequently sends the measurement results as a report message to the base station controller BSC via the serving base station. The report message contains the signal measurement results for the serving base station and for up to the six best neighboring base stations.

When the mobile station MS moves in the area of the mobile communication network, it normally connects to the base station BTS with the strongest signal. Thus the system attempts to establish any mobile station MS terminated or mobile station MS originated call via this base station BTS. If the base station BTS into which the mobile station MS is connected cannot offer a traffic channel for call setup, for example, because of overload, the system executes a so-called directed retry. In this case, the traffic channel is selected during the call setup phase from a cell other than that in which the signaling was performed. The mobile communication network selects the next strongest base station by using the measurement results delivered by the mobile station MS as a report message during call setup signaling and directs the call to be established to the traffic channel of this base station.

The problem with the directed retry according to the prior art is that the serving base station is selected according to single measurement results, even though the mobile station may just be leaving the coverage of the base station selected. The selection of a base station unsuitable in relation to the movement direction of the mobile station will in this case shortly result in a handover. In other words, the problem is the inability of the directed retry according to the prior art to predict, for how long the selected target cell will be the best cell as far as the mobile station call setup is concerned.

SUMMARY OF THE INVENTION

The purpose of this invention is to implement the directed retry in such a manner that, for traffic initiation, the system will select the base station whose signal will probably be sufficient for maintaining the call for longer than any other of the possible base stations.

This will be accomplished by using a system of the type described in the introduction for directed retry for which it is characteristic according to the invention that the measurements performed in the mobile station are used to determine the change in the reception level of the signal of at least one candidate cell, and the target cell for directed retry is selected from the candidate cells by using the determined changes in the reception levels of the signals so that the target cell selected is the candidate cell whose value for the change in the reception level of the signal meets a predefined criterion.

Additionally, the invention relates to a control unit for controlling the directed retry. The control unit is adapted to receive measurement reports, to detect the need for directed retry, to use the results of the measurement report to select at least one neighboring cell as the candidate cell for directed retry, and to initiate the directed retry into the selected target cell. It is characteristic for the control unit, according to this invention, that it is additionally adapted to determine the change in the signal reception level of at least one candidate cell on the basis of the received measurement reports and to select as the target cell for the directed retry by using the determined changes in signal reception levels the candidate cell whose value for the change in the signal reception level meets a predefined criterion.

The invention is based on the idea that the system attempts to determine the direction of movement of the mobile station in relation to the base station of the candidate cell for directed retry by comparing the consecutive measurement results delivered by the mobile station for the base station signal of the candidate cell in question to one another and by monitoring the change in the signal. As the target cell for directed retry is selected the cell for which the change in consecutive measurement results of the base station signal increases most or decreases least. When the base station signal increases rapidly, it may be assumed that the mobile station is moving towards the base station and thus will remain in the coverage of the base station for a longer time than in the coverage of those base stations whose signal strength increases less. If all base station signals decrease, the selected target cell, according to this invention, is one for which the reception level of the base station signal received in the mobile station has decreased least. In one embodiment of the invention it is possible to set a threshold value for the target cell selection, and the change in the base station signal level must exceed this threshold in order for the system to select the traffic channel from the base station in question.

The advantage of this kind of method is that the probability of success for directed retry is improved and thus the probability for the call being cut off decreases.

Another advantage of the method according to this invention is that the need for handovers is decreased.

Yet another advantage in this invention is that the load of the mobile communication network is divided in a more optimal fashion between the different base stations when the call is not always transferred to the same cell with the strongest signal level but to the cell that is best in relation to the movement direction of the mobile station.

BRIEF DESCRIPTION OF THE DRAWINGS

The description of the preferred embodiments of the invention will now be made with reference to examples described in FIGS. 2 and 3 of the attached drawings, in which.

DETAILED DESCRIPTION OF THE INVENTION

Figure 1:
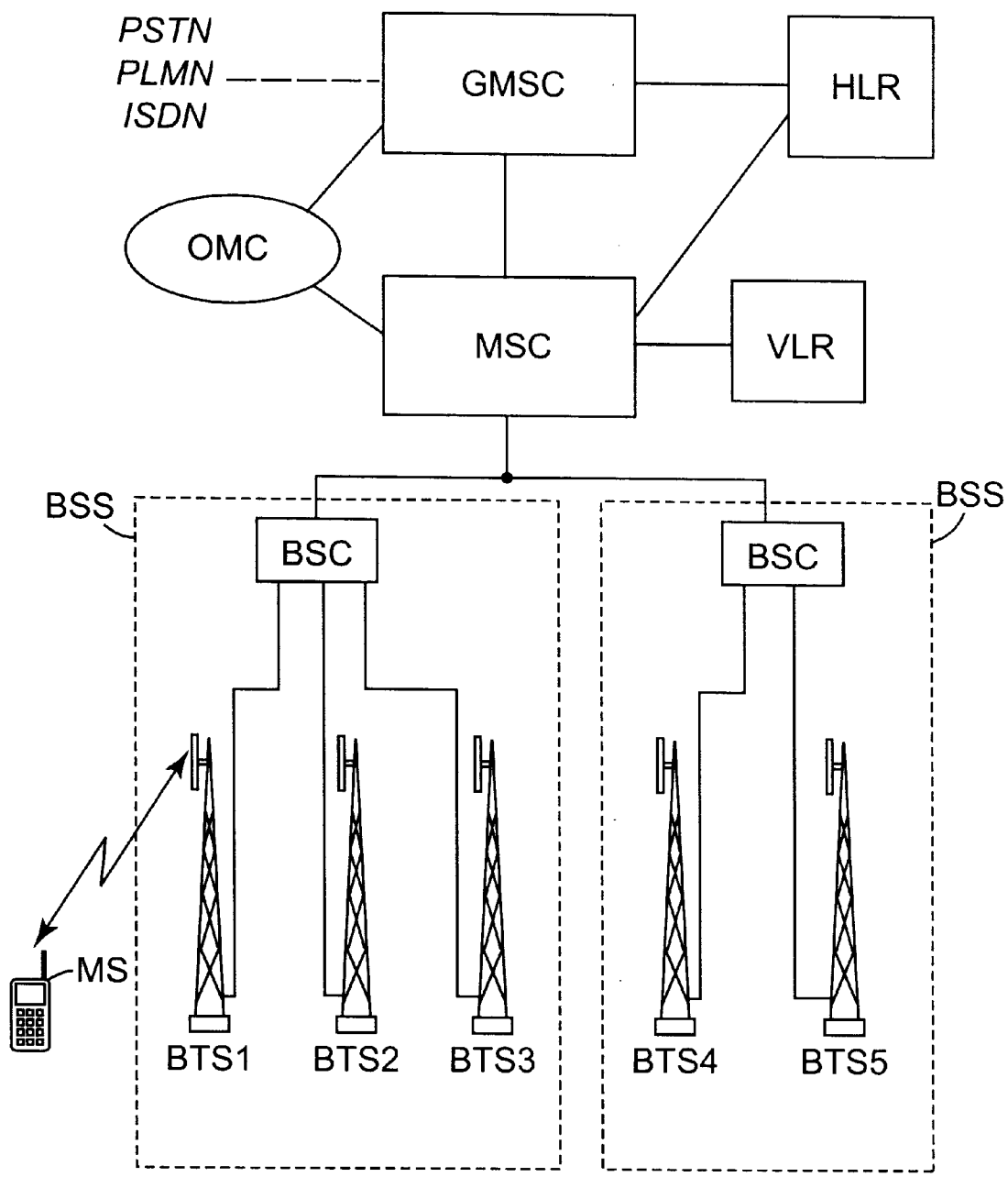
FIG. 1 shows the parts of the mobile communication network essential for the invention.

The present invention can be used in any mobile communication system. In later sections, the invention has been described mainly as related to the Pan-European digital GSM mobile communication system. FIG. 1 shows the simplified GSM network structure as described earlier. For a more detailed description of the operation and structure of a GSM system, a reference is made to GSM specifications and to a book "The GSM System for Mobile Communications", M. Mouly & M. Pautet, Palaiseau, France, 1992, ISBN:2-9507190-0-7.

The invention is described in more detail below in the light of its primary embodiment and with reference to FIGS. 2 and 3.

Figure 2:
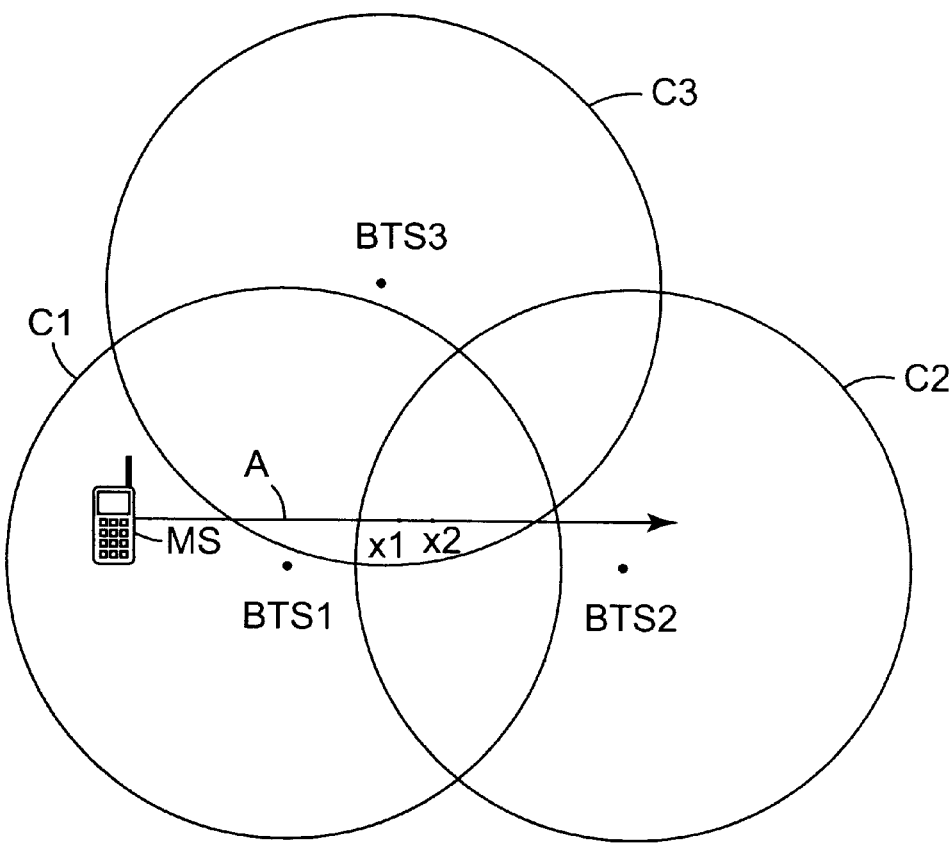
FIG. 2 shows an example of the cell structure of the mobile communication network.

FIG. 2 shows an example of the cell structure of a mobile communication network. This invention is described by using a sample situation, base stations BTS1, BTS2 and BTS3, and their coverage areas C1, C2 and C3. In the figure the arrow A represents the movement of the mobile station MS in the cellular network. The establishment of a call originating or terminating in the mobile station MS is started within the area of the cell C1 via call setup signaling between the base station BTS1 and the mobile station MS. If the base station BTS1 cannot assign a traffic channel for the mobile station MS, for example, because the base station BTS1 is overloaded, the system determines, according to the prior art, the need for directed retry to the traffic channel of another base station. According to the prior art, the mobile station MS continuously measures the level of the signal received in the mobile station from the serving base station BTS1, and that of the base stations of the neighboring cells, in FIG. 2 BTS2 and BTS3. Furthermore, according to the prior art, during call setup signaling the mobile station MS sends these measurement results as a report message via the serving base station BTS1 to the base station controller BSC. The suitable target cell for directed retry is selected according to the present invention by using the measurement results delivered by the mobile station MS in the report message in a manner described later in more detail.

Figure 3:
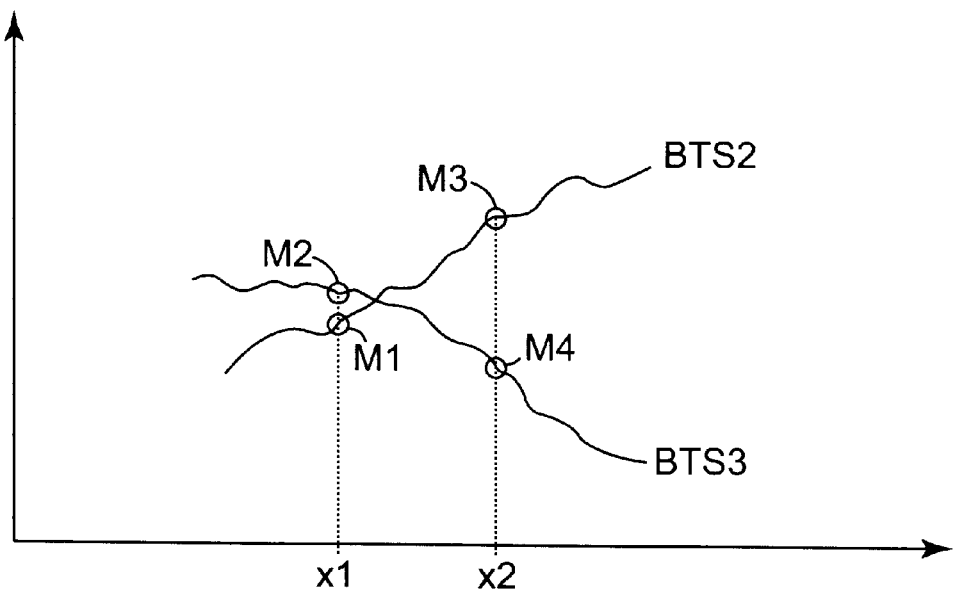
FIG. 3 shows a sample case of the change in the level of the base station signals.

FIG. 3 shows the signal level graphs for base stations BTS2 and BTS3 along the route of the mobile station MS in the direction of the arrow A. Two measuring locations x1 and x2 have been indicated in FIG. 3. They correspond to locations x1 and x2 shown in FIG. 2 along the arrow A. At location x1 the mobile station MS measures the signal levels from the surrounding cells it receives. The measurement result M1 in FIG. 3 corresponds to the signal level of the base station BTS2 at location x1 and the result M2 corresponds to the signal level of the base station BTS3 which, according to the example shown in FIG. 3, is stronger than the corresponding signal level of the base station BTS2. The mobile station MS reports the next measurement results to the network from location x2 where the measurement result M3 corresponds to the signal level of the base station BTS2 and the result M4 to the signal level of the base station BTS3. According to the present invention, the change between the base station signals BTS2 and BTS3 is determined by using the measurement results from these two consecutive report messages. The change in the signa level from location x1 to location x2 for the base station BTS2 is the difference of the measurement results M1 and M3. If, for example, M1=−90 dBm and M3=−86 dBm, the change in the signal level of the base station BTS2 is, as a signed value, +4 dBm. Correspondingly, the change in the signal level for the base station BTS3 moving from location x1 to x2 is the difference of the measurement results M2 and M4 which is, for example, by using the measurement results M2=−89 dBm and M4=−92 dBm, as a signed value, −3 dBm. By comparing the above changes in the signal levels of the base stations BTS2 and BTS3 to one another, it is possible to determine that the signed value for the change for the base station BTS2 is greater than the corresponding value for the base station BTS3 and thus the base station BTS2 is the better choice as far as call setup is concerned. According to the present invention, the base station BTS2 is selected as the target cell for directed retry, and the mobile station MS is assigned a traffic channel from the base station BTS2 for call traffic, or, in other words, the directed retry is performed to the base station BTS2. If the change in the base station signal for all possible candidate cells is decreasing, it is possible to select as the target cell for directed retry the candidate cell whose base station signal change decreases the least in a method according to the present invention.

In other embodiments of the invention, the target cell can also be selected on the basis that the change in the base station signal is sufficient. In this case, the absolute changes in signal that exceed the threshold T predefined by the operator, enable the system to perform a directed retry to the cell in question.

In the secondary embodiment of the invention, the primary embodiment of the invention is expanded by adding to it the base station signal quality, such as carrier wave/interference ratio C/I as a selection criterion. In this case, the measurement results reported by the mobile station MS are used to determine a co-channel or adjacent channel interference in addition to the information described above, and the base station signal level for each candidate cell is divided by the interference level of the cell in question. In this case, the cell selected as the target cell is the cell that meets the criterion set for the base station signal change and has the greatest C/I or a C/I value that exceeds a predefined threshold.

If the interference level of the candidate cell required for the secondary embodiment of the invention cannot be determined, for example, because of other signals transmitted on the same frequency or because the interference signal is not included in the measurement results of the report message, the interference level is estimated by using a reference cell. The use of a reference cell in a handover method is described in the FI patent application number 941779. A cell whose transmission has a similar signal profile to that of the cell being estimated, but a different transmission frequency is selected as the reference cell. Additionally, the signal of the reference cell must be included in the signals whose measurement results the mobile station MS reports to the serving base station in the report message. The signal level measured from the reference cell is corrected by the propagation loss between the reference cell and the cell being estimated so that the estimate corresponds, at the place of reception, to the signal level of the cell whose signal level was to be determined originally.

The present invention is also suitable for use with only a part of the mobile stations in a mobile communication system, for example, only for mobile stations that move relatively rapidly. In this case, the velocity of the mobile station is determined, and the functionality of the method described above in the primary or secondary embodiment of the invention is only implemented for mobile stations whose velocity exceeds a predefined threshold value. The velocity of the mobile stations MS is defined by using a suitable method. It is only essential to determine the magnitude of the mobile station velocity and the actual method used to determine the velocity is unimportant for the invention. Some methods for determining the velocity of the MS have been presented, for example, in patent application publications WO 92/01950 and FI 953013. The target cell for directed retry for mobile stations other than those determined to be moving rapidly is selected according to the prior art.

The change in the base station signal of the candidate cell described above for different embodiments of the invention is determined from at least two preferably consecutive measurement results of the same base station signal. The reliability of the method is increased, if there are more than two measurement results of the same base station signal available. In this case, it is possible to compare the base station signals changes from a longer time interval to one another and to select the best and most suitable cell for traffic as the target cell for the directed retry.

The present invention is especially suitable to be used in connection with traffic channel queuing. Traffic channel queuing is a common feature of mobile communication systems in which the system waits during the call setup phase in the signaling channel for the traffic channel to be released. According to the prior art, during queuing the mobile station measures the signal levels of the target cell and the neighboring cells, and sends the measurement results as a report message via the serving base station to the base station controller. For the method of the present invention, queuing provides time for more measurements and for comparing the consecutive results to determine the change in the base station signal.

The functionality described in the invention would be best located in the mobile communication system unit that controls the directed retry, preferably integrated in the BSC.

The figures and their explanation are only intended to demonstrate the concept of the invention. The details of a method and control unit described in the invention can vary within the patent claims. Thus a method described in the invention can also be implemented, for example, in such a manner that the first candidate cell that meets the requirements for the selection of the target cell is selected as the target cell for directed retry in which case it is not necessary to perform the functions according to the method for other candidate cells.

What is claimed is:

1. A method for directed retry in a mobile communication system, the said method comprising:
    measuring the reception level of signals from neighboring cells of a target cell in a mobile station;
    sending the measurement results as a report message from the mobile station MS to a mobile communication network;
    detecting a need for directed retry;
    selecting at least one neighboring cell as the candidate cell for directed retry on the basis of the measurements; and
    executing the directed retry into the selected target cell;
    wherein the method further comprises:
        determining a change in the reception level of the signal of at least one candidate cell on the basis of measurements performed in the mobile station;
        determining an interference level of the signal of at least one candidate cell on the basis of measurements performed in the mobile station; and
        selecting the target cell for directed retry from the candidate cells by using the determined changes in the reception levels and determined interference levels of the signals so that the target cell selected is the candidate cell whose determined change in reception level and ratio of the reception level to the determined interference level is maximized.

2. The method according to claim 1, wherein the said method comprises:
    determining the change of the reception level of the signal for at least two candidate cells in the mobile station as a difference of at least two measured signal levels on the basis of the performed measurements;
    determining the change of the interference level of the signal for at least two candidate cells in the mobile station as a difference of at least two measured interference levels on the basis of the performed measurements; and
    selecting the target cell for directed retry from the candidate cells by using the determined changes in the reception levels and changes in the interference levels of the signal so that the target cell selected is the candidate cell whose determined changes in the reception level and ratio of the determined changes in reception level to the determined changes in the interference level increases at a fastest rate.

3. The method according to claim 2, wherein the target cell selected is the only candidate cell whose change in the reception level of the signal and the ratio of the change in reception level to the change in interference level is increasing sufficiently compared to a predefined threshold level.

4. The method according to claim 1, wherein the said method comprises:
    determining the change of the reception level of the signal for at least two candidate cells in the mobile station as the difference of at least two measured signal levels on the basis of the performed measurements;

determining the change of the interference level of the signal for at least two candidate cells in the mobile station as the difference of at least two measured interference levels on the basis of the performed measurements; and selecting the target cell for directed retry from the candidate cells by using the determined changes in the reception levels and the determined changes in the interference levels of the signal so that the target cell selected is the candidate cell whose determined changes in the reception level and ratio of the determined changes in reception level to the determined changes in the interference level decreases at a slowest rate.

5. The method according to claim 4, wherein only the candidate cell whose change in the reception level of the signal and the ratio of the change in reception level to the change in interference level is decreasing sufficiently little compared to a predefined threshold level is selected as the target cell.

6. The method according to claim 1, wherein the change in the reception level of the signal and the interference level of the signal for at least two candidate cells is determined on the basis of at least two consecutive measurements performed in the mobile station.

7. The method according to claim 1, wherein the said method comprises:

determining the change in the reception level of the signal of at least one candidate cell on the basis of at least two consecutive measurements performed in the mobile station as a difference between signal levels;

determining the change in the interference level of the signal of at least one candidate cell on the basis of at least two consecutive measurements performed in the mobile station as a difference between interference levels; and selecting the target cell for directed retry from the candidate cells by using the determined changes in the reception levels of the signal and determined changes in the interference levels of the signal so that the target cell selected is the candidate cell whose determined changes in the reception levels of the signal and ratio of the determined changes in reception level to the determined changes in the interference level of the signal is increasing sufficiently compared to a predefined threshold value.

8. The method according to claim 1, wherein the said method comprises:

determining the change in the reception level of the signal of at least one candidate cell on the basis of at least two consecutive measurements performed in the mobile station as a difference between the signal levels;

determining the change in the interference level of the signal of at least one candidate cell on the basis of at least two consecutive measurements performed in the mobile station as a difference between the interference levels; and selecting the target cell for directed retry from the candidate cells by using the determined changes in the reception levels of the signal and determined changes in the interference levels of the signal so that the target cell selected is the candidate cell whose determined changes in the reception levels of the signal and ratio of the determined changes in reception level to the determined changes in the interference level of the signal is decreasing sufficiently little compared to a predefined threshold value.

9. An apparatus for controlling a directed retry, comprising: a control unit configured to receive measurement reports, to detect the need for directed retry, to select at least one neighboring cell as a candidate cell for directed retry by using the results of the measurement report, and to initiate the execution of directed retry into the selected target cell, wherein the control unit is to determine the change in the reception level of the signal of at least one candidate cell on the basis of the received measurement reports;

to determine an interference level of the signal of at least one candidate cell on the basis of the received measurement reports; and to select the target cell for directed retry from the candidate cells by using the determined changes in the reception level and determined interference level of the signal so that the target cell selected is the candidate cell whose determined change in reception level and ratio of the reception level to the determined interference level is maximized.

* * * * *